US012339639B2

(12) United States Patent
Okuda et al.

(10) Patent No.: US 12,339,639 B2
(45) Date of Patent: Jun. 24, 2025

(54) CONTROLLER, MACHINE TOOL, CALCULATION METHOD, AND NON-TRANSITORY COMPUTER READABLE STORAGE MEDIUM

(71) Applicant: Yamazaki Mazak Corporation, Niwa-gun (JP)

(72) Inventors: Toshihito Okuda, Niwa-gun (JP); Ryo Yoshida, Niwa-gun (JP); Akira Iseki, Niwa-gun (JP); Yasuhiko Suzuki, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 331 days.

(21) Appl. No.: 17/680,294

(22) Filed: Feb. 25, 2022

(65) Prior Publication Data

US 2022/0179391 A1 Jun. 9, 2022

Related U.S. Application Data

(63) Continuation of application No. PCT/JP2019/034450, filed on Sep. 2, 2019.

(51) Int. Cl.
*G05B 19/404* (2006.01)
*B23Q 15/12* (2006.01)

(52) U.S. Cl.
CPC .......... *G05B 19/404* (2013.01); *B23Q 15/12* (2013.01); *G05B 2219/33034* (2013.01)

(58) Field of Classification Search
CPC ........ G05B 19/404; G05B 2219/33034; G05B 13/0265; G05B 2219/49206;
(Continued)

(56) References Cited

U.S. PATENT DOCUMENTS

2015/0370242 A1 12/2015 Takeno
2017/0091667 A1 3/2017 Yukawa
(Continued)

FOREIGN PATENT DOCUMENTS

CN 105182908 12/2015
CN 106488828 3/2017
(Continued)

OTHER PUBLICATIONS

The International Preliminary Report on Patentability (Chapter I) with translation of Written Opinion for corresponding International Application No. PCT/JP2019/034450, Mar. 17, 2022.
(Continued)

*Primary Examiner* — Kamini S Shah
*Assistant Examiner* — Mohammed Shafayet
(74) *Attorney, Agent, or Firm* — MORI & WARD, LLP

(57) ABSTRACT

A controller includes data collect circuitry configured to collect machining data including a date and a time when at least one machined portion of a workpiece has been machined by a machine tool, temperature circuitry configured to obtain, at predetermined time intervals, temperature data at positions on the machine tool, dimension data input circuitry configured to receive dimension measurement data which includes a dimension of the machined portion after the machined portion has been machined, learning data generate circuitry configured to generate learning data based on the machining data and the dimension measurement data, and machine learning circuitry configured to execute a machine learning based on the temperature data and the learning data to obtain a correction coefficient based on which a displacement caused by a change in a temperature of the machine tool is corrected according to a thermal displacement correction equation.

14 Claims, 16 Drawing Sheets

(58) Field of Classification Search
CPC ...... G05B 2219/49219; G05B 19/4083; G05B 2219/37211; B23Q 15/12; B23Q 15/18; G06N 20/00
See application file for complete search history.

(56) References Cited

U.S. PATENT DOCUMENTS

| | | | | |
|---|---|---|---|---|
| 2017/0185063 | A1* | 6/2017 | Suzuki | .................. B23Q 15/04 |
| 2018/0107947 | A1* | 4/2018 | Ogawa | ............... G05B 19/4155 |
| 2018/0196405 | A1* | 7/2018 | Maekawa | ............ G05B 19/404 |
| 2018/0276570 | A1* | 9/2018 | Watanabe | ............ G05B 19/042 |
| 2019/0011898 | A1 | 1/2019 | Saeki | |
| 2019/0018391 | A1 | 1/2019 | Rogers et al. | |
| 2019/0025794 | A1 | 1/2019 | Matsumura | |
| 2019/0091869 | A1* | 3/2019 | Yamazaki | ................ B25J 15/08 |
| 2019/0099850 | A1 | 4/2019 | Hada et al. | |
| 2020/0101579 | A1* | 4/2020 | Suzuki | .................... H01L 22/26 |
| 2020/0117164 | A1* | 4/2020 | Susumu | ............... G05B 19/404 |
| 2020/0183359 | A1* | 6/2020 | Nishino | ............. G05B 19/4093 |
| 2020/0342356 | A1* | 10/2020 | Bao | ....................... G05B 19/408 |

FOREIGN PATENT DOCUMENTS

| | | | | |
|---|---|---|---|---|
| CN | 106560751 | 4/2017 | | |
| CN | 108287525 | 7/2018 | | |
| CN | 108628256 | 10/2018 | | |
| CN | 109202538 | 1/2019 | | |
| CN | 109283887 | 1/2019 | | |
| JP | 03-208540 | 9/1991 | | |
| JP | 06-8107 | 1/1994 | | |
| JP | 2820170 B2 * | 11/1998 | .......... | G05B 19/404 |
| JP | 2005-52917 | 3/2005 | | |
| JP | 6001211 | 9/2016 | | |
| JP | 2018-111145 | 7/2018 | | |
| JP | 2019-111648 | 7/2019 | | |
| WO | WO 2016/067874 | 5/2016 | | |

OTHER PUBLICATIONS

International Search Report for corresponding International Application No. PCT/JP2019/034450, Nov. 19, 2019.
Written Opinion for corresponding International Application No. No. PCT/JP2019/034450, Nov. 19, 2019.
Japanese Office Action for corresponding JP Application No. 2020-513931, Jun. 9, 2020 (w/ English machine translation).
Japanese Office Action for corresponding JP Application No. 2020-513931, Oct. 20, 2020 (w/ English machine translation).
Chinese Office Action for corresponding CN Application No. 201980099787.2, Dec. 27, 2022.
Chinese Office Action for corresponding CN Application No. 201980099787.2, Jul. 4, 2022.
Supplementary European Search Report for corresponding EP Application No. 19944154.4-1224, Jul. 18, 2022.
European Office Action for corresponding EP Application No. 19944154.4-1224, Jul. 29, 2022.

* cited by examiner

FIG. 6

| | | Trigger# | Initial product | Target value | Offset | Upper limit | Lower limit | φ | Learning target | Workpiece No. |
|---|---|---|---|---|---|---|---|---|---|---|
| 2019.8.9 | 9:45:20 | 2 | 1 | 100 | 0 | 0.02 | -0.02 | 0 | HD1 Y axis upper tool rest | W0001 |
| 2019.8.9 | 10:10:40 | 1 | 1 | 35 | -0.02 | 0.02 | -0.02 | 1 | HD1 X axis upper tool rest | W0001 |
| 2019.8.9 | 11:00:10 | 3 | 1 | 40 | 0 | 0.02 | -0.02 | 0 | HD1 Z axis upper tool rest | W0001 |
| . | . | | | | | | | | | |
| . | . | | | | | | | | | |
| . | . | | | | | | | | | |

FIG. 7

| | | Measurement value | Trigger# |
|---|---|---|---|
| 2019.8.9 | 9:45:20 | 100.010 | 2 |
| 2019.8.9 | 10:10:40 | 35.010 | 1 |
| 2019.8.9 | 11:00:10 | 39.995 | 3 |
| . | . | | |
| . | . | | |

FIG. 8

| | Trigger# | Initial product | Measurement value | Target value | Offset | Upper limit | Lower limit | φ | Learning target | Workpiece No. |
|---|---|---|---|---|---|---|---|---|---|---|
| 2019.8.9 9:45:20 | 2 | 1 | 100.010 | 100 | 0 | 0.02 | -0.02 | 0 | HD1 Y axis upper tool rest | W 0 0 0 1 |
| 2019.8.9 10:10:40 | 1 | 1 | 35.010 | 35 | -0.02 | 0.02 | -0.02 | 1 | HD1 X axis upper tool rest | W 0 0 0 1 |
| 2019.8.9 11:00:10 | 3 | 1 | 39.995 | 40 | 0 | 0.02 | -0.02 | 0 | HD1 Z axis upper tool rest | W 0 0 0 1 |
| . . . | | | | | | | | | | |

FIG. 9

| | | HD1 X axis upper tool rest | HD1 Y axis upper tool rest | HD1 Z axis upper tool rest | ... |
|---|---|---|---|---|---|
| 2019.8.9 | 10:10:10 | 20.5 | -10.5 | 32.5 | |
| 2019.8.9 | 10:10:20 | 20.5 | -10.5 | 32.5 | |
| 2019.8.9 | 10:10:30 | 20.5 | -10.5 | 32.5 | |
| 2019.8.9 | 10:10:40 | 20.6 | -10.6 | 33.4 | |
| 2019.8.9 | 10:10:50 | 20.6 | -10.6 | 33.4 | |
| 2019.8.9 | 10:11:00 | 20.8 | -10.8 | 33.8 | |
| 2019.8.9 | 10:11:10 | 20.8 | -10.8 | 33.8 | |
| 2019.8.9 | 10:11:20 | 20.8 | -10.8 | 33.8 | |
| ... | | | | | |

FIG. 10

| | | T1 | T2 | T3 | ... |
|---|---|---|---|---|---|
| 2019.8.9 | 10:10:10 | 31.22 | 33.55 | 28.64 | |
| 2019.8.9 | 10:10:20 | 31.22 | 33.54 | 27.64 | |
| 2019.8.9 | 10:10:30 | 31.22 | 33.53 | 27.64 | |
| 2019.8.9 | 10:10:40 | 31.23 | 33.53 | 27.24 | |
| 2019.8.9 | 10:10:50 | 31.23 | 33.53 | 27.55 | |
| 2019.8.9 | 10:11:00 | 31.23 | 33.53 | 28.12 | |
| 2019.8.9 | 10:11:10 | 31.26 | 33.53 | 28.12 | |
| 2019.8.9 | 10:11:20 | 31.26 | 33.53 | 28.12 | |
| ... | ... | ... | | | |

FIG. 11

| Trigger# | Initial product | Measurement value | Target value | Offset | Upper limit | Lower limit | φ | Learning target | Workpiece No. | Correction amount | T1 | T2 | T3 | ... |
|---|---|---|---|---|---|---|---|---|---|---|---|---|---|---|
| 1 | 1 | 35.010 | 35 | -0.02 | 0.02 | -0.02 | 1 | HD1 X axis upper tool rest | W 0 0 0 1 | 20.6 | 31.23 | 33.53 | 27.24 | |
| | | | | | | | | | | | | | | |
| | | | | | | | | | | | | | | |
| | | | | | | | | | | | | | | |

| Trigger# | | Initial product | No-correction value | Target value | Offset | Upper limit | Lower limit | φ | Learning target | Workpiece No. | Correction amount | T1 | T2 | T3 | ... |
|---|---|---|---|---|---|---|---|---|---|---|---|---|---|---|---|
| 2019.8.9 | 10:10:40 | 1 | 1 | 35.0094 | 35 | -0.02 | 0.02 | -0.02 | 1 | HD1 X axis upper tool rest | W0001 | 20.6 | 31.23 | 33.53 | 27.24 |
| · · · | | | | | | | | | | | | | | | |

FIG. 13

| | Level.1 | Level.2 | Level.3 | Level.4 | Level.5 |
|---|---|---|---|---|---|
| Weight | 5 | 10 | 20 | 35 | 50 |

CONTROLLER, MACHINE TOOL, CALCULATION METHOD, AND NON-TRANSITORY COMPUTER READABLE STORAGE MEDIUM

CROSS-REFERENCE TO RELATED APPLICATIONS

The present application is a continuation application of International Application No. PCT/JP2019/034450, filed Sep. 2, 2019. The contents of this application are incorporated herein by reference in their entirety.

BACKGROUND OF THE INVENTION

Field of the Invention

The present invention relates to a controller, a machine tool, a calculation method, and a non-transitory computer readable storage medium.

Discussion of the Background

Components of a machine tool undergo thermal expansion due to heat generated by operating the machine tool and external heat around the machine tool. Thermal expansion is known to cause an error in the positioning between the cutting edge of a tool and a workpiece machined, to the detriment of the accuracy with which a machine tool machines a workpiece. Such thermal expansion-caused degradation in the accuracy of the positioning between the cutting edge of a tool and a workpiece machined is referred to as thermal displacement.

In light of thermal expansion considerations, some numerical controllers (hereinafter referred to as "controller(s)") for controlling machine tools have a function to correct thermal displacement. In this case, a thermal displacement correcting function employed is implemented by: providing each of main components constituting a machine tool with a temperature sensor; multiplying the temperature of each component by a coefficient; obtaining a sum of the values obtained by the multiplications; and regarding the sum as the amount of thermal displacement correction.

There are, however, a large number of heat sources that can cause thermal displacement, and it is not easy to correct a thermal displacement accurately.

JP6001211B1 discloses a machine tool that includes a thermal displacement correction amount setting changer provided with a plurality of temperature sensors mounted on components constituting the machine tool. Based on temperatures from the plurality of temperature sensors, the machine tool estimates a drive-system thermal displacement amount and an environment temperature-system thermal displacement amount. Then, the machine tool subjects these amounts to correction magnification processing and adds the resulting values of the amounts together. In this manner, the machine tool calculates the total amount of thermal displacement correction.

SUMMARY OF THE INVENTION

According to one aspect of the present invention, a controller includes data collect circuitry configured to collect machining data including a date and a time when at least one machined portion of a workpiece has been machined by a machine tool, the at least one machined portion being set as a learning target; temperature circuitry configured to obtain, at predetermined time intervals, temperature data at a plurality of positions on the machine tool; dimension data input circuitry configured to receive dimension measurement data which includes a dimension of the at least one machined portion after the at least one machined portion has been machined; learning data generate circuitry configured to generate learning data based on the machining data and the dimension measurement data; and machine learning circuitry configured to execute a machine learning based on the temperature data and the learning data to obtain a correction coefficient based on which a displacement caused by a change in a temperature of the machine tool is corrected according to a thermal displacement correction equation.

According to another aspect of the present invention, a machine tool includes a machining data collect circuitry configured to collect machining data including a date and a time when at least one machined portion of a workpiece has been machined by the machine tool, the at least one machined portion being set as a learning target; temperature circuitry configured to obtain, at predetermined time intervals, temperature data at a plurality of positions on the machine tool; dimension data input circuitry configured to receive dimension measurement data which includes a dimension of the at least one machined portion after the at least one machined portion has been machined; learning data generate circuitry configured to generate learning data based on the machining data and the dimension measurement data; and machine learning circuitry configured to execute a machine learning based on the temperature data and the learning data to obtain a correction coefficient based on which a displacement caused by a change in a temperature of the machine tool is corrected according to a thermal displacement correction equation.

According to further aspect of the present invention, a calculation method includes setting at least one machined portion of a workpiece as a learning target, collecting machining data including a date and a time when the at least one machined portion has been machined by a machine tool, obtaining, at predetermined time intervals, temperature data at a plurality of positions on the machine tool, receiving dimension measurement data which includes a dimension of the at least one machined portion after the at least one machined portion has been machined, generating learning data based on the machining data and the dimension measurement data, and executing a machine learning based on the temperature data and the learning data to obtain a correction coefficient based on which a displacement caused by a change in a temperature of the machine tool is corrected according to a thermal displacement correction equation.

According to the other aspect of the present invention, a non-transitory computer readable storage medium is configured to retrievably storing a computer-executable program therein. The computer-executable program causes a computer to perform a calculation method. The calculation method includes setting at least one machined portion of a workpiece as a learning target, collecting machining data including a date and a time when the at least one machined portion has been machined by a machine tool, obtaining, at predetermined time intervals, temperature data at a plurality of positions on the machine tool, receiving dimension measurement data which includes a dimension of the at least one machined portion after the at least one machined portion has been machined, generating learning data based on the machining data and the dimension measurement data, and executing a machine learning based on the temperature data and the learning data to obtain a correction coefficient based on which a displacement caused by a change in a temperature of the machine tool is corrected according to a thermal displacement correction equation.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 6 illustrates a file layout of trigger information;

FIG. 7 illustrates a file layout of dimension data;

FIG. 8 illustrates a file layout of integrated data;

FIG. 9 illustrates a file layout of a thermal displacement correction log;

FIG. 10 illustrates a file layout of a temperature log;

FIG. 11 illustrates a file layout of correction-including dimension data in learning data;

FIG. 12 illustrates a file layout of no-correction dimension data in the learning data;

FIG. 13 illustrates a file layout of a learning weight;

DESCRIPTION OF THE EMBODIMENTS

Figure 1:
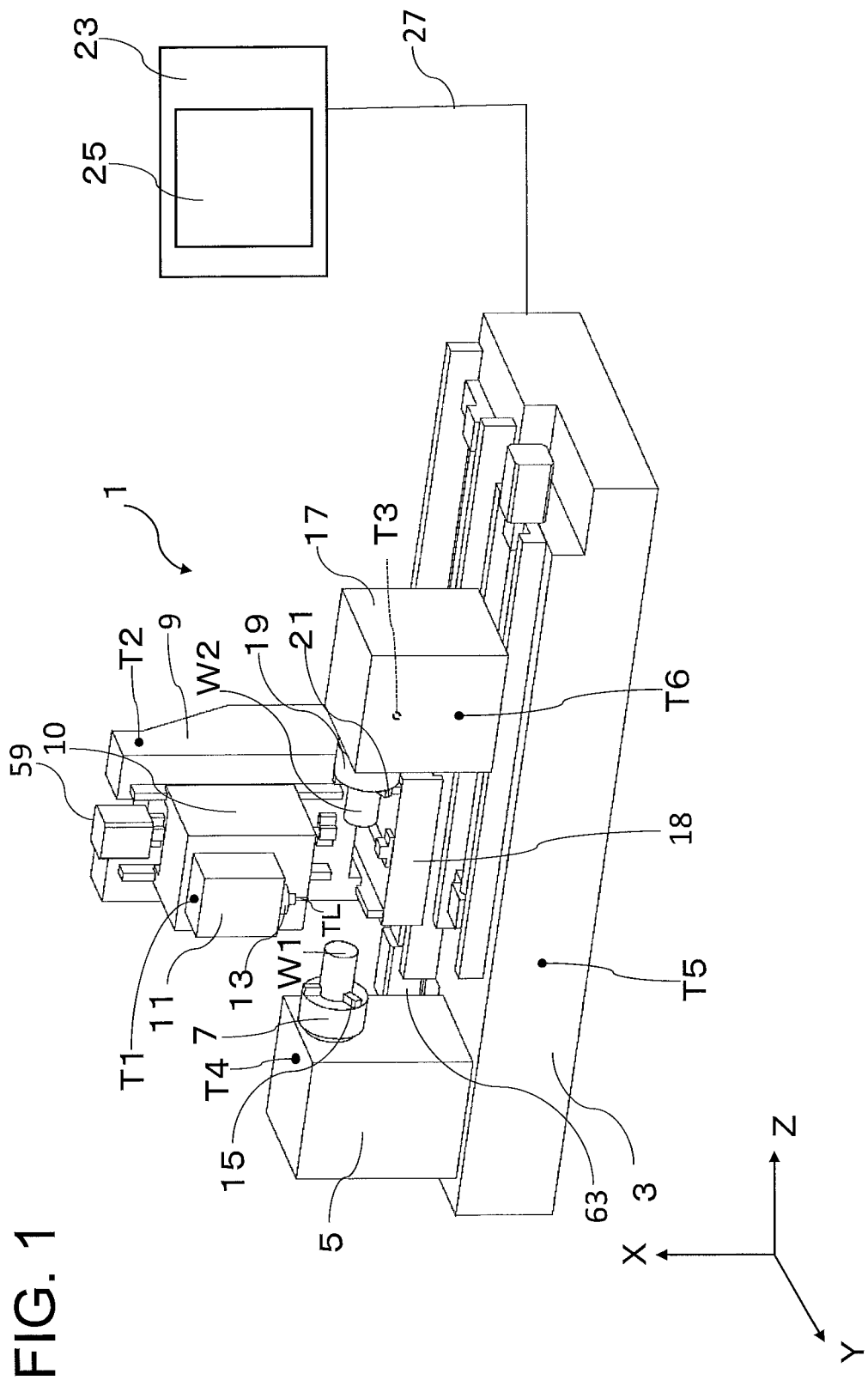
FIG. 1 is a perspective view of a configuration of a machine tool according to an embodiment.

The embodiments will now be described with reference to the accompanying drawings, wherein like reference numerals designate corresponding or identical elements throughout the various drawings.

Configuration of Machine Tool

FIG. 1 illustrates a main configuration of a machine tool 1 according to this embodiment. The machine tool according to this embodiment includes: a workpiece holder that holds a workpiece; and a tool holder that holds a tool. With this configuration, the machine tool machines the workpiece using the tool by rotating at least one of the workpiece and the tool and moving at least one of the workpiece and the tool in a predetermined direction.

The machine tool also includes a plurality of temperature sensors mounted on components constituting the machine tool.

Specifically, the machine tool 1 includes: a bed 3; a first workpiece headstock 5, which is fixed to the bed 3; a first workpiece spindle 7, which is mounted on the first workpiece headstock 5 and rotatable in C axis direction; a carriage base 18, which is a movable member movable on the bed 3 along Y axis direction and Z axis direction; a carriage 9, which is placed on the carriage base 18; a saddle 10, which is a movable member movable on the carriage 9 along X axis direction; a tool headstock 11, which is mounted on the saddle 10 and swingable along B axis direction; a tool spindle 13, which is a rotatable tool holder mounted on the tool headstock 11; and a controller 23, which controls these components.

It is to be noted that X axis, Y axis, and Z axis are regarded as axes along which a movable member moves. It is also to be noted that B axis is intended to mean a movement axis of the tool spindle 13 in the direction in which the tool spindle 13 rotates about the Y axis, and that the C axis is intended to mean a movement axis of the first workpiece spindle 7 or a second workpiece spindle 19 in the direction in which the first workpiece spindle 7 or the second workpiece spindle 19 rotates about the Z axis.

A tool TL is attached to the tool spindle 13, and a workpiece W1 is attached to a chuck 15, which is a workpiece holder mounted on the first workpiece spindle 7. With the tool TL and the workpiece W1 in this arrangement, the workpiece W1 is machined using the tool TL.

The machine tool 1 further includes a second workpiece headstock 17, which is movable on the bed 3 along the Z axis direction. The second workpiece headstock 17 includes the second workpiece spindle 19, which is rotatable along the C axis direction. A workpiece W2 is attached to a chuck 21, which is a workpiece holder mounted on the second workpiece spindle 19. With the workpiece W2 in this arrangement, the workpiece W2 is machined using the tool TL as well.

It is to be noted that while the tool spindle 13 of the machine tool 1 illustrated in FIG. 1 has a configuration of an upper tool rest, the tool spindle 13 may have a configuration of a lower tool rest in addition to a configuration of an upper tool rest.

Temperature Sensors and Thermal Displacement Correction

As illustrated in FIG. 1, temperature sensors T1 to T6 are mounted on the above-described components of the machine tool 1 (the temperature sensors are indicated by dots or broken line circles in FIG. 1). Specifically, the temperature sensor T1 is mounted on the tool headstock 11. The temperature sensor T2 is mounted on the carriage 9. The temperature sensor T3 is mounted on the carriage base 18. The temperature sensor T4 is mounted on the first workpiece headstock 5. The temperature sensor T5 is mounted on the bed 3 at or near its center portion immediately under the machining region, considering that the center portion is greatly affected by heating involved in cutting. The temperature sensor T6 is mounted on the second workpiece headstock 17.

Thus, the temperature sensors T1 to T6 are respectively mounted on the tool headstock 11, the carriage 9, the carriage base 18, the first workpiece headstock 5, the bed 3, and the second workpiece headstock 17. This arrangement ensures that not only temperatures at particular positions on the machine tool 1 but also temperatures at various other positions on the machine tool 1 are measured.

It is to be noted that when the number of temperature sensors that the machine tool includes is n, the amount of thermal displacement correction for the cutting edge can be calculated by solving the Formula shown below for each of the X axis, the Y axis, and the Z axis. It is to be noted that for purposes of illustration, only a single Formula for calculating the amount of thermal displacement correction is shown, and that in actual situations, three correction equations are solved to calculate the amounts of thermal displacement correction for the X axis, the Y axis, and the Z axis.

$$\text{Amount of thermal displacement correction} = (a1 \times T1 + a2 \times T2 + \ldots + an \times Tn)$$
$$(a1 \text{ to } an\text{:correction coefficient}, T1 \text{ to } Tn\text{:temperature})$$

The amount of thermal displacement correction thus calculated is added to position commands transmitted to an X axis motor 59, a Y axis motor 61, and a Z axis motor 63, which are mounted on predetermined components. In this manner, the movement of the cutting edge is corrected.

As can be seen from the above description, to automatically calculate an appropriate amount of thermal displacement correction for a machine tool means to automatically calculate the correction coefficients a1 to an in the above-described equation so that an appropriate amount of thermal displacement correction is calculated.

Configuration of Controller

As illustrated in FIG. 1, the controller 23 of the machine tool 1 is communicably connected to the machine tool 1. The communication between the controller 23 and the machine tool 1 may be made through a cable 27 or using another communication means such as wireless communication. The controller 23 is implemented by a computer, another information processing device, and a storage device, and includes elements such as a CPU, a RAM, and a ROM, not illustrated.

Figure 2:
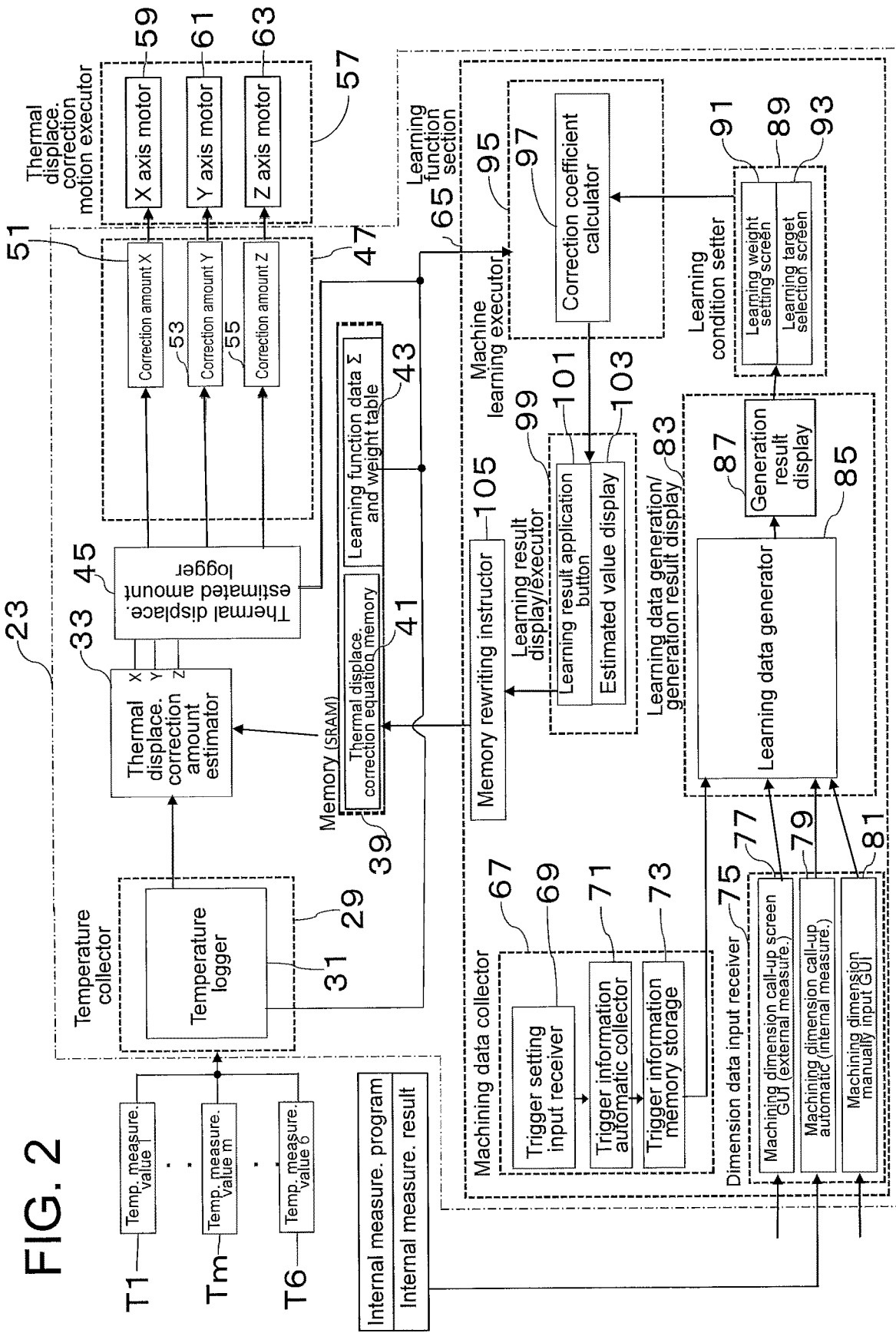
FIG. 2 is a block diagram of a controller provided in the machine tool according to the embodiment.

A display 25 may be mounted on the controller 23 or in the form of a structure separate from the controller 23. The display 25 may also serve as a trigger setting input receiver (an example of "trigger setting input circuitry") 69, a learning data generation/generation result display 83, a generation result display 87, and an estimated value display 103, which are illustrated in FIG. 2. The display 25 is also capable of displaying various kinds of data and serving as an input-output device. Therefore, the display 25 may also serve as the trigger setting input receiver 69 and a dimension data input receiver (an example of "dimension data input circuitry") 75. For example, the display 25 may be implemented in the form of a touch panel on which an input and an output are made.

FIG. 2 is a diagram illustrating a hardware configuration of the controller 23, which is provided in the machine tool 1.

The controller 23 includes: a temperature collector (an example of "temperature circuitry") 29, which is associated with the temperature sensors T1 to T6; a thermal displacement correction amount estimator 33; a memory 39, which is made up of elements such as an SRAM; a thermal displacement estimated amount logger 45; and a commander 47.

The temperature collector 29 includes a temperature logger 31. At predetermined time intervals (for example, 10-second intervals), the temperature collector 29 collects and stores temperature data of a plurality of positions on the machine tool 1 from the temperature sensors T1 to T6.

The thermal displacement correction amount estimator 33 reads a correction equation from a thermal displacement correction equation memory 41, which is stored in the memory 39. Then, the thermal displacement correction amount estimator 33 calculates a thermal displacement correction amount by solving this correction equation.

The thermal displacement estimated amount logger 45 stores the value of the thermal displacement correction amount obtained at the thermal displacement correction amount estimator 33.

The commander 47 outputs: a movement command indicating a correction amount X 51, which is for the X axis; a movement command indicating a correction amount Y53, which is for the Y axis; and a movement command indicating a correction amount Z55, which is for the Z axis.

The machine tool 1 also includes a thermal displacement correction motion executor 57. The thermal displacement correction motion executor 57 adds the above-described correction amounts to the respective position commands for the X, Y, and Z axes, and causes the X axis motor 59, the Y axis motor 61, and the Z axis motor 63 to move the cutting edge in the X, Y, and Z axes by amounts indicated by the position commands. Each of the X axis motor 59, the Y axis motor 61, and the Z axis motor 63 is made up of a servo motor, for example. With the configuration described above, the workpiece W1 is machined into proper dimensions within a tolerance range.

A learning circuitry 65 includes a machining data collector (an example of "machining data collect circuitry") 67, the dimension data input receiver 75, the learning data generation/generation result display 83, a learning condition setter (an example of "learning condition setting circuitry") 89, a machine learning executor (an example of "machine learning circuitry") 95, a learning result display/executor 99, and a memory rewriting instructor 105.

The machining data collector 67 is configured to select machining data (log data) that is to be subjected to machine learning. For this purpose, in order to identify the kind of log data to collect, it is necessary at the machining data collector 67 to set, as a learning target, items such as: information for identifying an axis along which to move a movable member of the machine tool; and a machined portion. The trigger setting input receiver 69 is an input receiver for identifying such collection data.

In light of this necessity, the following items can be specified at the trigger setting input receiver 69: (1) information concerning initial product and chip exchange, (2) specification of diameter/radius, (3) target value, (4) upper tolerance limit, (5) lower tolerance limit, (6) learning target position (for example, "upper tool rest of first workpiece spindle X axis"), (7) workpiece No. (workpiece number), (8) trigger No. (trigger number), and (9) block No. (block number). Among these items, (7) workpiece No. is information for identifying a machining program, and (9) block No. is a number indicating a command position of an individual machined portion in the machining program. Thus, workpiece No. and block No. are data used later for specifying a machined portion and calculating a thermal displacement correction amount. For example, temperatures are automatically measured at predetermined time intervals at the temperature sensors T1 to T6 (which are provided at predetermined positions on the machine tool 1) and are stored in correlation with measurement times. Also, the date and time when the current workpiece was machined are input, ensuring that the temperature at the machining time can be checked. Then, by inputting dimension measurement data at the actual machining time, a difference between the target dimension and the actual dimension can be calculated. Then, by correlating the difference with the temperatures measured at the temperature sensors T1 to T6, which are provided on the machine tool 1, learning data can be obtained. It is to be noted that the dimension measurement data difference may be calculated based on an initial product dimension.

Figure 3:
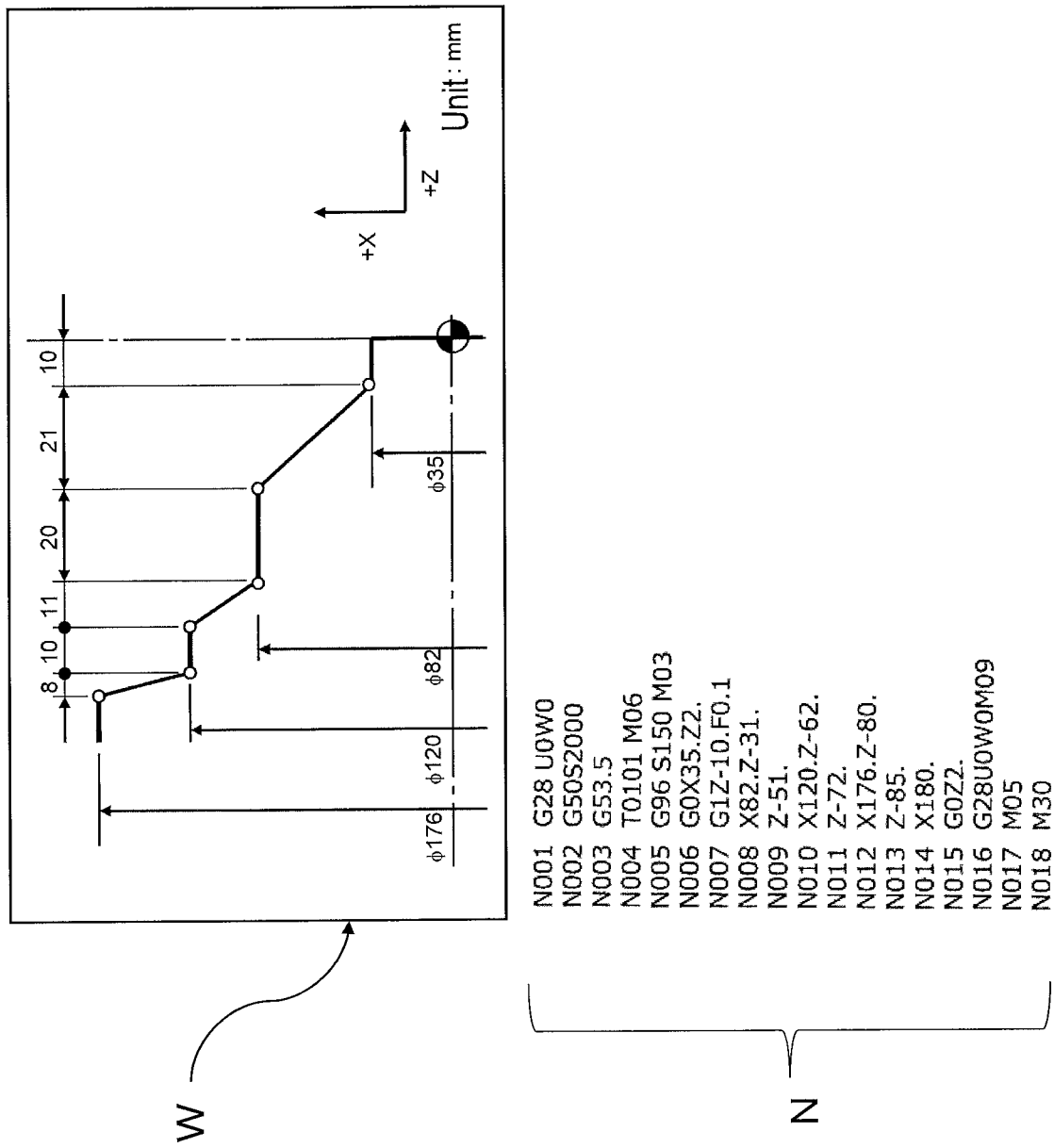
FIG. 3 illustrates a relationship between machined portion and block No.

By referring to FIG. 3, a relationship between a machined portion and block No. will be described. FIG. 3 illustrates a cross-section of a part of a final product obtained by machining the workpiece W using the machine tool 1. The workpiece W exemplified here has a cylindrical portion having a diameter φ of 176.0 mm (millimeter), a cylindrical portion having a diameter φ of 120.0 mm (millimeter), a cylindrical portion having a diameter φ of 82.0 mm (millimeter), and a cylindrical portion having a diameter φ of 35.0 mm (millimeter). Adjacent cylindrical portions are connected to each other by a continuous inclined surface. Block Nos. indicate portions of the workpiece W represented by numbers starting with "N" in FIG. 3, namely, N001 to N018. Using a block No. facilitates the identification of a command position of an individual machined portion in the machining program in machining the workpiece W. For example, the command for machining the cylindrical portion having a diameter ϕ of 176.0 mm (millimeter) is described in block No. "N013", the command for machining the cylindrical portion having a diameter ϕ of 82.0 mm (millimeter) is described in "N009", and the command for machining the cylindrical portion having a diameter ϕ of 35.0 mm (millimeter) is described in "N007". Incidentally, in some cases, it is necessary to identify a machined portion where a high level of accuracy is required in conforming with tolerance and to machine this machined portion with a higher level of accuracy. In this example, the machined portion having a diameter ϕ of 35.0 mm (millimeter) and the machined portion having a diameter ϕ of 82.0 mm (millimeter) will be assumed as corresponding to such machined portion. In this case, block Nos. "N007" and "N009" are used to set, as learning targets, these machined portions where a high level of accuracy is required in conforming with tolerance. That is, a machined portion can be specified by a number indicating a position in the machining program.

Figure 14:
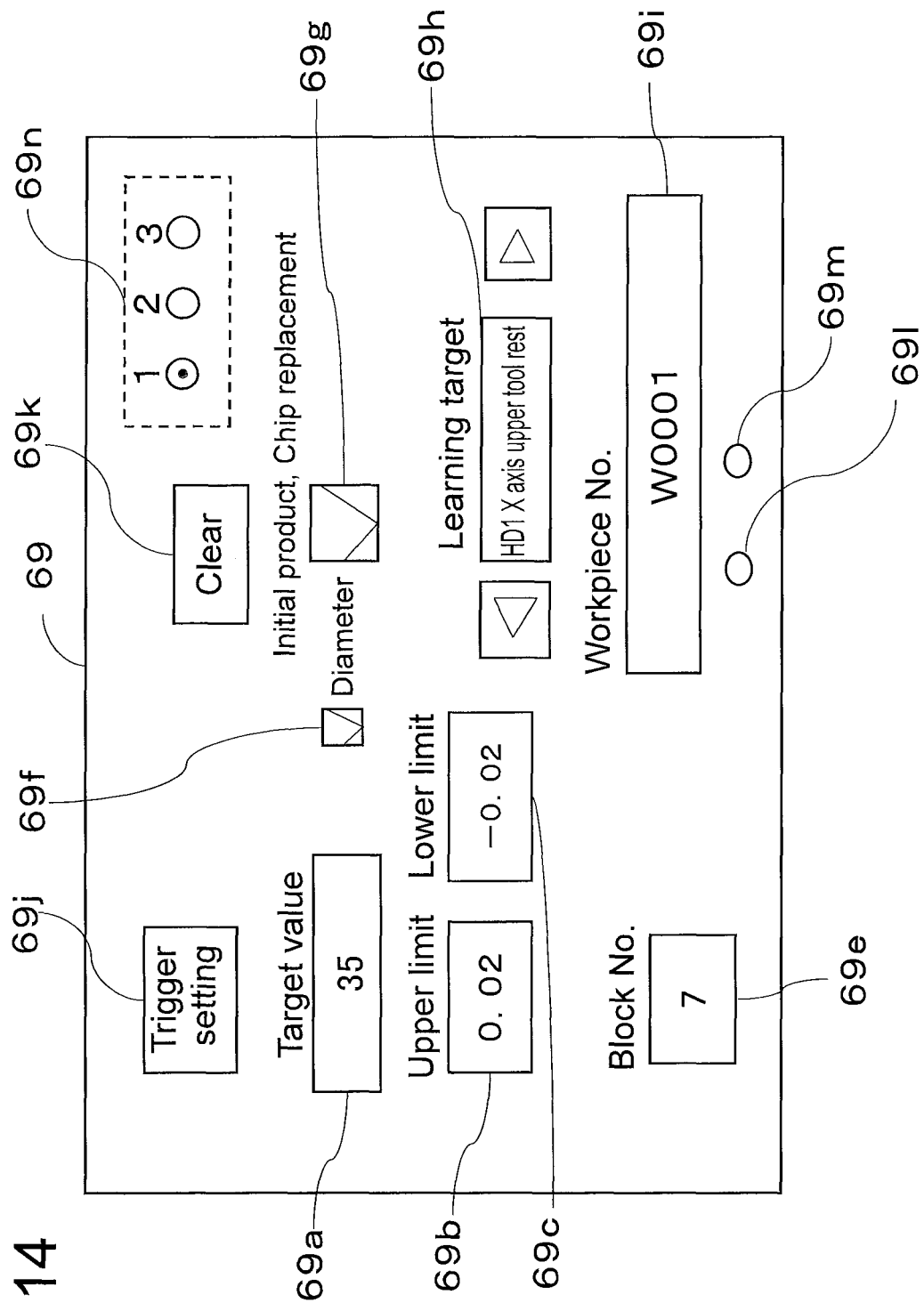
FIG. 14 is a diagram illustrating an example trigger setting input receiver.

A specific example of the trigger setting input receiver 69 is illustrated in FIG. 14. The trigger setting input receiver 69 includes (a) a target value entry field 69a, which is for inputting a target dimension of a workpiece (a value indicated in the figure), (b) an upper limit entry field 69b and a lower limit entry field 69c, which are for inputting upper/lower tolerance limits, respectively, (c) 69e, which is an entry field for inputting block No., (d) 69f, which is checked when the target value and tolerance are in diameter, (e) 69g, which is a check column for initial product and chip exchange time, (f) a learning target axis entry field 69h, which is for inputting information for identifying an axis that is among the axes to move a movable member of the machine tool and that is a target axis for learning, (g) a workpiece number entry field 69i, which is for inputting a learning target workpiece, and (h) a trigger button 69n, which is for specifying trigger number. There are three different kinds of trigger setting; by selecting "1", "2", or "3" on the trigger button 69n, the trigger setting can be switched between the three different kinds.

The trigger setting input receiver 69 further includes: a trigger setting button 69j, which is for setting (storing) input data; and a clear button 69k, which is for clearing (deleting) input data.

It is to be noted that the content set using the trigger setting input receiver 69 is effective through all machinings once the trigger setting button 69j is pressed. It is also possible to make a setting for each group of machined portions of a workpiece. For example, by switching between "1", "2", and "3" on the trigger button 69n, it is possible to set the above-described item data separately for a group made up of the machined portion having a diameter ϕ of 35.0 mm (millimeter), the machined portion having a diameter ϕ of 82.0 mm (millimeter), and the machined portion having a diameter ϕ of 176.0 mm (millimeter), illustrated in FIG. 3. In this case, if the machined portion having a diameter ϕ of 35.0 mm (millimeter) and the machined portion having a diameter ϕ of 82.0 mm (millimeter) have important dimensions, it is possible to set a greater learning weight, described later, for the machined portions. This increases the efficacy of the amount of thermal displacement correction.

The machining data collector 67 includes: a trigger information automatic collector 71, which automatically collects the machining data set at the trigger setting input receiver 69; and a trigger information memory storage 73, which stores trigger information in a memory.

The trigger information automatic collector 71 automatically collects: the date and time when the machined portion set at the trigger setting input receiver was actually machined by the machine tool 1; and an offset. Then, the trigger information automatic collector 71 stores the collected information in the trigger information memory storage 73.

An offset will be described. As used herein, the tem' "offset" is intended to mean data input by an operator. For example, if the accuracy with which the workpiece W is machined gradually degrades over time while the workpiece W is being machined, an offset can be forcibly implemented so that the dimension of the machined portion is secured within the tolerance range. It is possible to store this offset data and use this offset data to calculate an actual thermal displacement correction amount. Specifically, by adding this offset value, an accurate amount of thermal displacement correction can be calculated. Further, it is possible to input an offset after machining of a workpiece ends and before machining of a next workpiece starts. Thus, insofar as the machining accuracy of a workpiece W is monitored, implementing an offset eliminates or minimizes occurrence of a defective product in the machining performed at or after the offset.

The dimension data input receiver 75 is a screen used in calculating the coefficient of the thermal displacement correction equation by machine learning. Specifically, dimension measurement data obtained by measuring a post-machining dimension of a machined portion set as a learning target is collected and input on the dimension data input receiver 75 based on the setting of the trigger setting input receiver 69.

The dimension data input receiver 75 is made up of any one of (1) to (3). (1) A semi-automatic "machining dimension call-up screen GUI (external measurement) 77", which receives an input of a measurement result measured outside the machine tool. (2) A "machining dimension call-up automatic (internal measurement) 79", which automatically calls up all dimension measurement data measured in the machine tool 1. (3) A "machining dimension manually input GUI 81", which receives a manual input of all machining dimension measurement data associated with a learning target axis. It is to be noted that a machining dimension may not necessarily be obtained by measuring a workpiece itself.

It is possible to: attach a touch sensor to the tool spindle 13 illustrated in FIG. 1; measure, using the touch sensor, a change in a coordinate of a predetermined position on the machine tool 1; and regard the measured change as dimension measurement data.

The learning data generation/generation result display 83 includes a learning data generator (an example of "learning data generate circuitry") 85. The learning data generator 85 is configured to generate learning data by comparing the machining data collected by the machining data collector 67 with the dimension measurement data collected and input by the dimension data input receiver 75. Then, the learning data generation/generation result display 83 displays the generated result on the generation result display 87.

The learning condition setter 89 sets, on a learning weight setting screen 91, a learning weight to the machined portion selected on a learning target selection screen 93.

The machine learning executor 95 causes a correction coefficient calculator 97 to execute a machine learning based on the learning data and calculate a correction coefficient in a thermal displacement correction equation, which is used to correct a displacement caused by a change in the temperature of the machine tool 1.

Processings performed by the learning condition setter 89 and the machine learning executor 95 will be described later in "Operation of Learning Circuitry".

The learning result display/executor 99 displays a simulation graph of pre-machine learning and post-machine learning results on the estimated value display 103. As described later, when a post-machine learning simulation result is satisfactory, a user presses a learning result application button 101 to cause the memory rewriting instructor 105 to rewrite the thermal displacement correction equation stored in the thermal displacement correction equation memory 41 with the post-machine learning correction coefficient.

When, in contrast, the post-machine learning simulation result is unsatisfactory, the user may re-set a learning weight and/or a learning target, thus repeating a machine learning until a satisfactory simulation result is obtained. This ensures a correction coefficient used in a thermal displacement correction equation for a thermal displacement correction suitable for an environment in which a machine tool is provided.

Operation of Learning Circuitry

Next, an operation of the learning circuitry 65 will be described by referring to the flowcharts illustrated in FIGS. 4 and 5.

Step S01

Figure 4:
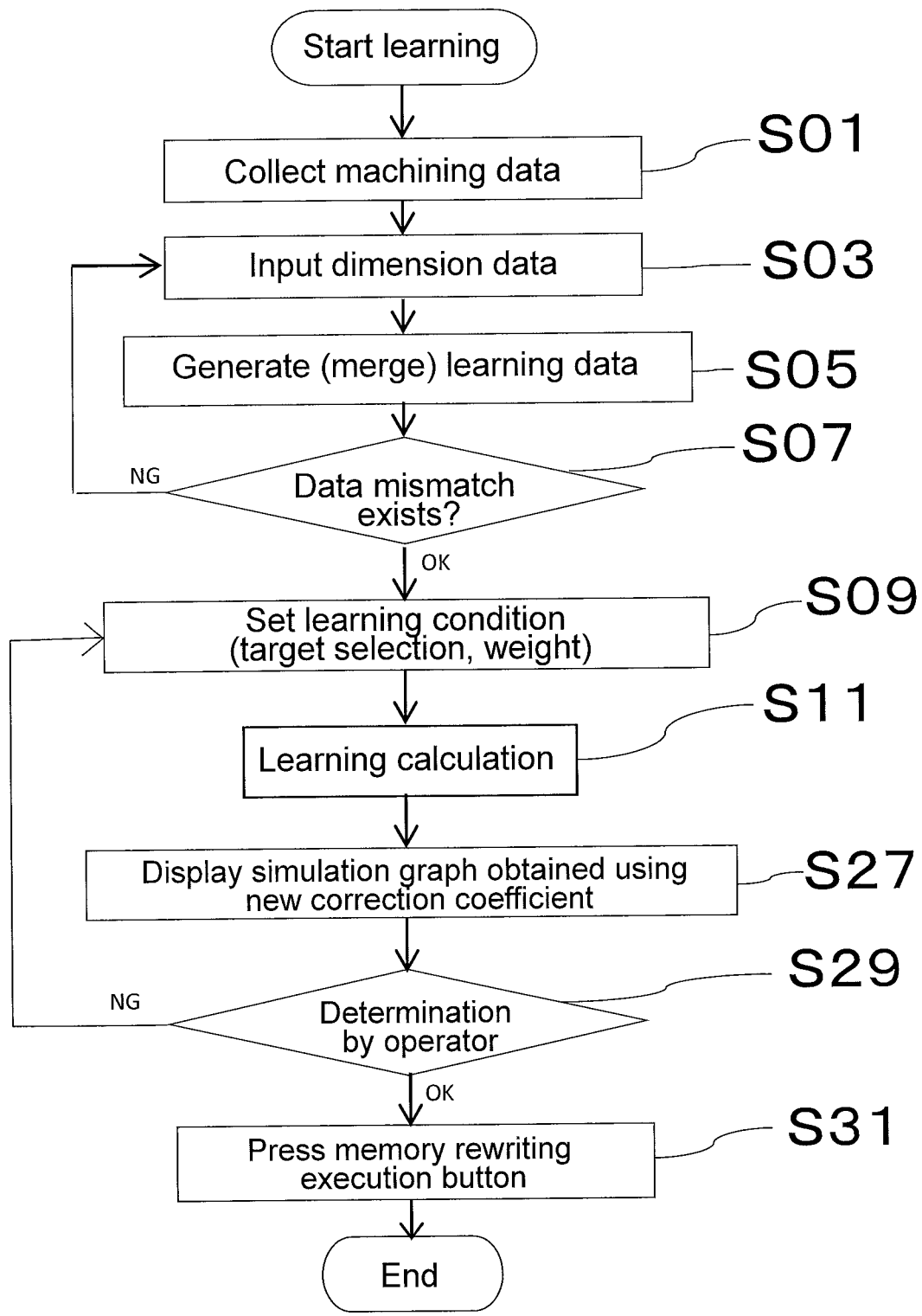
FIG. 4 is a flowchart of how a learning circuitry operates.
Figure 5:
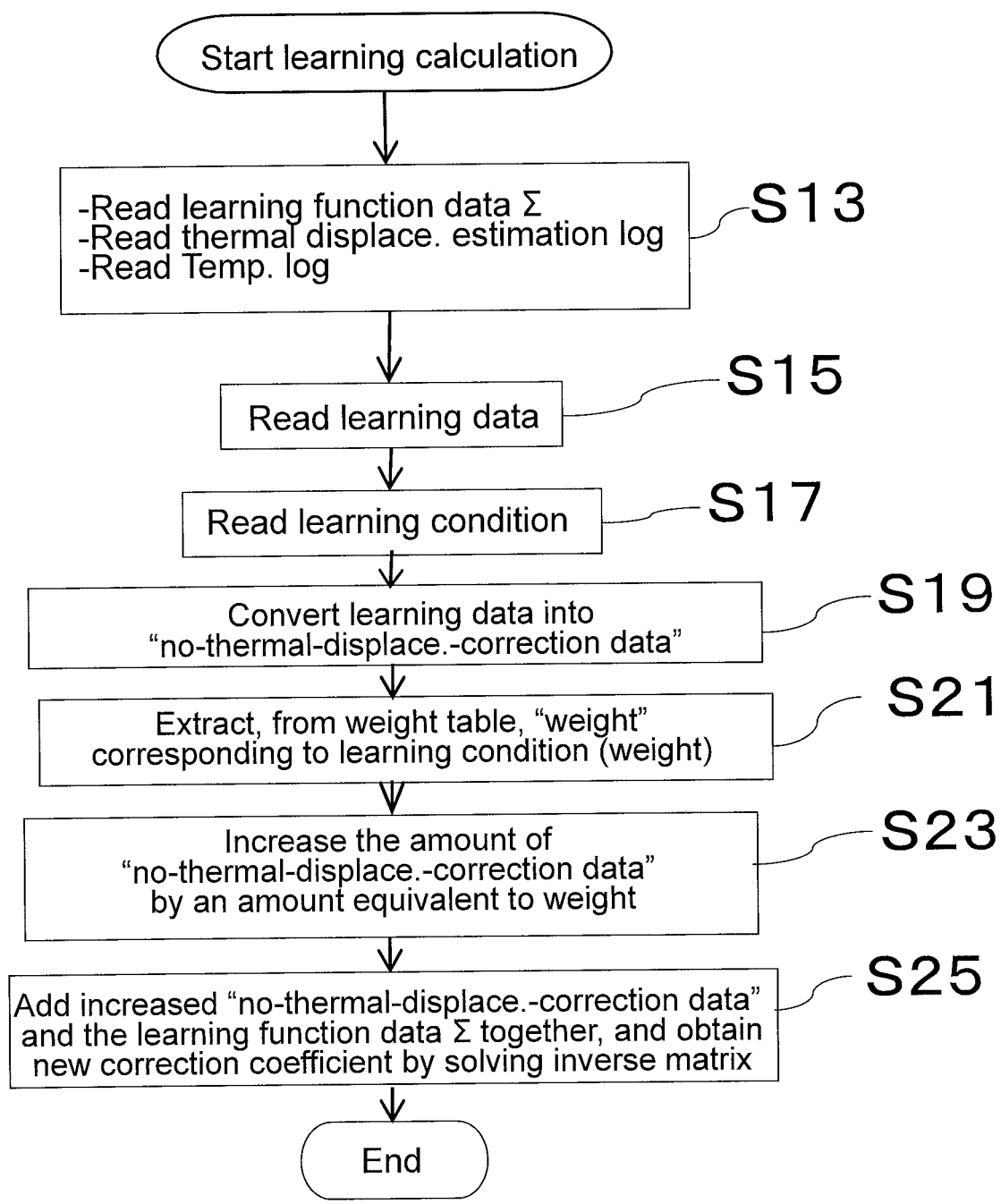
FIG. 5 is a flowchart of a learning calculation.

As illustrated in FIG. 4, at step S01, the trigger information automatic collector 71 collects machining data based on the content selected at the trigger setting input receiver 69.

As illustrated in FIG. 14, the trigger setting input receiver 69 includes, for example: the target value entry field 69a; an upper limit tolerance entry field 69b; a lower limit tolerance entry field 69c; a block No. entry field 69e, which is for inputting a block No. indicating a machining target portion in a workpiece machining program; the column 69f, which is a check column for workpiece diameter; the column 69g, which is a check column for initial product and chip exchange; the learning target axis entry field 69h, which is for inputting information for identifying a learning target axis; and the workpiece number entry field 69i, which is for inputting workpiece number.

The trigger setting input receiver 69 further includes: the trigger setting button 69j, which is for setting (storing) input data; and the clear button 69k, which is for clearing (deleting) input data.

The above-described items include at least one of: machining program number; and information for identifying a learning target axis. This makes it easier for the operator to select a machining target portion to which the operator wants to pay special attention, such as a portion of strict tolerance. As a result, a learning target can be determined accurately. This ensures a correction coefficient used in a thermal displacement correction equation for a thermal displacement correction suitable for an environment in which a machine tool is provided.

While the input items constituting the trigger setting input receiver 69 will not be limited to the above-described items, the controller or the machine tool according to this embodiment makes it easier to select a particular step, which normally takes much more time. As a result, machining data necessary for machine learning is efficiently collected.

The trigger information collected at step S01 and stored in a memory has a file layout as illustrated in FIG. 6, for example. Specifically, the date and time when the machined portion corresponding to the trigger information is machined by the machine tool 1 are first stored as machining data. Subsequently to the date and time data, next various data are stored in a memory. Trigger # is a number assigned to a machined portion of a workpiece. When "1" is assigned to the initial product, this indicates that a tool exchange has been performed. When "0" is assigned to the initial product, this indicates that no tool exchange is performed. Target value is a target dimension of machining. Offset is the amount of movement of the cutting edge input by the operator. Upper limit and Lower limit are those of tolerance. When $\phi$ is 1, the data value is in diameter. Learning target is information for identifying an axis that is among the axes to move a movable member of the machine tool and that is a learning target axis (for example, "HD1 Y axis upper tool rest" indicates the Y axis for machining the workpiece at the first workpiece spindle side using upper tool rest). Workpiece No. is information for identifying a machining program.

Thus, various machining data are stored in one row in a file so that the data are correlated with each other.

Step S03

Figure 15:
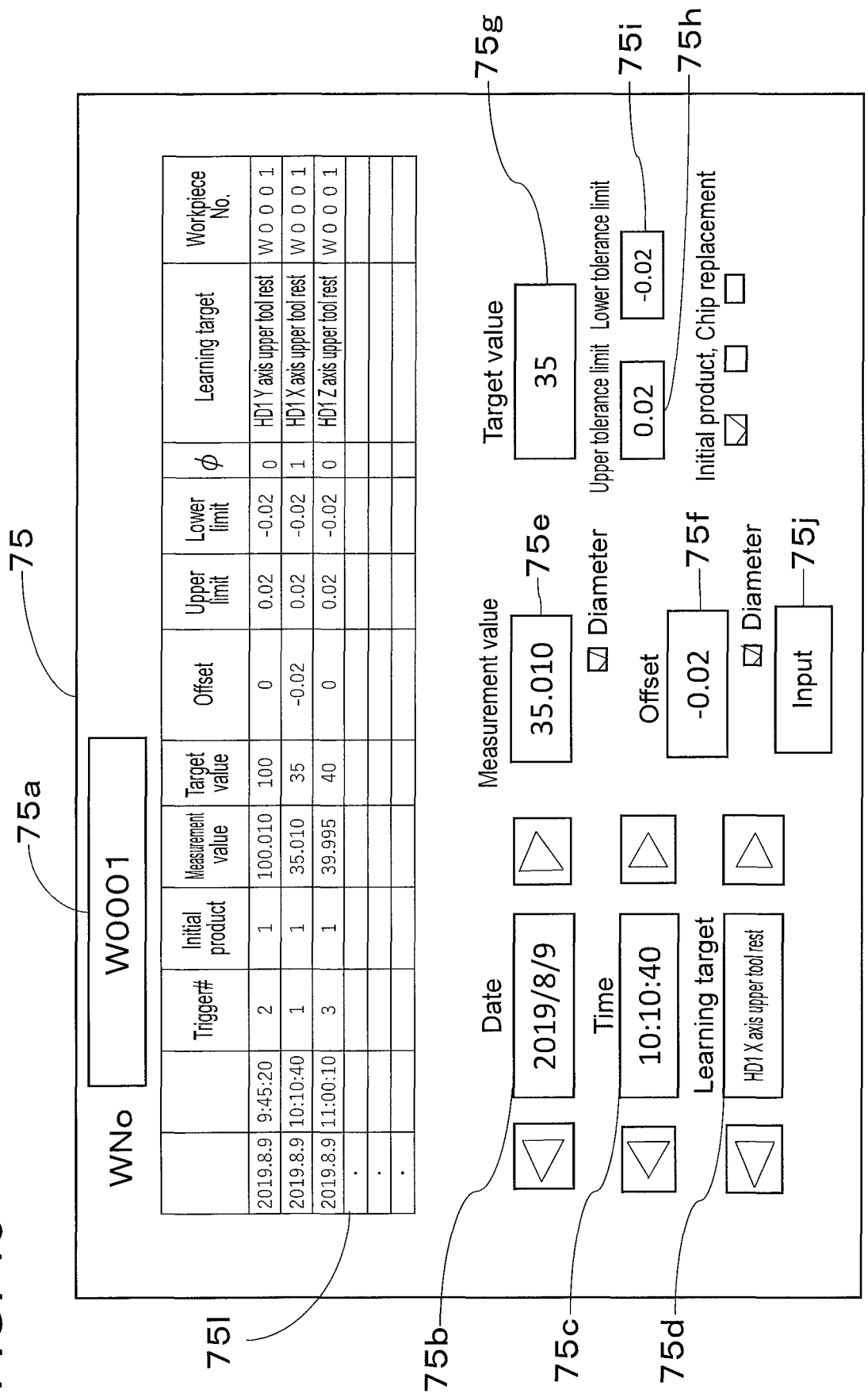
FIG. 15 is a diagram illustrating an example dimension data input receiver (where machining dimensions are manually input)

Next, at step S03, dimension data is input into the dimension data input receiver 75 as a result of machining work. FIG. 15 illustrates an example input receiver on which information such as machining dimension are manually input. This input receiver includes: a workpiece number entry field 75a, which is for inputting workpiece number; a date entry field 75b, which is for inputting date of machining; a machining time entry field 75c, which is for inputting time of machining; a learning target axis entry field 75d, which is for inputting information for identifying a learning target axis; a measurement value entry field 75e, which is for inputting a measurement value; an offset entry field 75f, which is for inputting an offset; a target value entry field 75g, which is for inputting a workpiece target value; an upper limit tolerance entry field 75h, which is for inputting an upper limit tolerance; and a lower limit tolerance entry field 75i, which is for inputting a lower limit tolerance. It is to be noted that all the entry fields excluding the measurement value entry field are automatically filled out with data collected by the machining data collector, and that the operator manually inputs a machining dimension into measurement value entry field based on these pieces of information.

When the operator manually inputs a machining dimension, data such as the data illustrated in FIG. 7 is used, for example.

Referring to FIG. 15, the dimension data input receiver 75 includes a window 751. By pressing an input button 75j, all the input dimension data are displayed in the window 751. The window 751 is scrollable.

The input items included in the dimension data input receiver will not be limited to the above-described input items; any other input items are possible insofar as they enable the operator to determine which machining data an actual machining dimension and the associated machining correspond to.

Also, while FIG. 15 illustrates a manual input screen, this input screen is not intended in a limiting sense. In such a case where a machining dimension is automatically externally measured, or in such a case where a machining dimension is called up from measurement data inside the machine tool, a possible input screen is that an item for identifying machining dimension data to call up can be input. For example, it is possible to obtain necessary machining dimension data only by identifying the date and time of machining and a dimension measurement position.

Regarding how to obtain machining dimension measurement data, possible methods are: calling up externally measured machining dimension measurement data; automatically calling up internally measured machining dimension measurement data; and manually inputting machining dimension measurement data. the controller or the machine tool according to this embodiment is capable of measuring machining dimension measurement data by these various methods. This configuration ensures that a suitable method can be freely selected based on machining dimension characteristics and/or a purpose of adjustment. This configuration also provides a design significantly easily handleable for the operator of the machine tool.

Regarding how to obtain machining dimension data, it is possible to employ either of the following methods: a method that sets a target item including a learning target and then collects dimension data of a particular machined portion corresponding to the target item that has been set; and a method that obtains all machining dimension data in advance and extracts a piece of machining dimension data that is selected from the all machining dimension data and that corresponds to the target item. Thus, there are various methods of collecting dimension data, and this broadens the range of machining program development.

Step S05

Next, at step S05, the learning data generation/generation result display 83 integrates the machining data collected by the machining data collector 67 with the dimension data specified by the dimension data input receiver 75. As a result, learning data actually used in machine learning is identified. It is to be noted, however, that in a case of manual input, the integration processing is performed at the time of manual input.

As a result of the integration of the machining data collected by the machining data collector 67 and the dimension data specified by the dimension data input receiver 75, the generation result display 87 illustrated in FIG. 2 displays a content as illustrated in, for example, FIG. 8. Specifically, the content includes, from left, the date and time of machining, trigger #, initial product, measurement value, target value, offset, upper limit tolerance, lower limit tolerance, indication or non-indication of diameter, information for identifying a learning target axis, and workpiece number.

Thus, the generation result display 87 displays a list of these integrated data. This ensures that input values of workpiece numbers can be easily compared with each other by rearranging the corresponding data. As a result, even if the operator makes an erroneous input, the erroneous input can be easily identified.

Thus, the data collected at step S05 and stored in a memory has a file layout as illustrated in FIG. 8, for example. Since the trigger information is generated by integrating the dimension data based on the date and time of machining, the learning data includes the following various data. Trigger # is a number assigned to a machined portion of a workpiece. When "1" is assigned to the initial product, this indicates that a tool exchange has been performed. Measurement value is dimension data that has been measured. Target value is a target dimension of machining. Offset is the amount of movement of the cutting edge input by the operator. Upper limit and Lower limit are those of tolerance. When ϕ is 1, the data value is in diameter. Learning target is information for identifying a learning target axis. Workpiece No. is information for identifying a machining program. Thus, various machining data are stored in one row in a file so that the data are correlated with each other.

Step S07

At step S07, the learning data generation/generation result display 83 determines whether there is a data mismatch between the machining data collected by the machining data collector 67 and the machining dimension data specified by the dimension data input receiver 75. When the learning data generation/generation result display 83 has determined that there is a data mismatch, the procedure goes back to step S03, where a re-input of dimension data is demanded. When the learning data generation/generation result display 83 has determined that there is no data mismatch, the procedure proceeds to step S09.

Step S09

Next, at step S09, the learning condition setter 89 sets a learning condition. Specifically, the learning condition setter 89 selects a machined portion of the workpiece as a learning target, and determines a learning weight condition.

In the controller or the machine tool according to this embodiment, a learning weight condition can be set on an individual-machined-portion basis. For example, there may be a machining target portion that is among a plurality of machining target portions and that is desired to be prioritized over other machining target portions in increasing machining accuracy. In this case, a learning weight condition can be set on this machining target portion. This ensures a correction coefficient used in a thermal displacement correction equation for a thermal displacement correction suitable for an environment in which a machine tool is provided.

This will be described later in "Details of Learning Calculation".

Step S11

At step S11, the machine learning executor 95 performs a machine learning (regression analysis) with the selection at step S09 taken into consideration.

Details of Learning Calculation

By referring to FIG. 5, the content of the learning calculation performed at S11 will be described as S13 through S25.

Step S13

At step S13, the machine learning executor 95 reads (1) learning function data Σ, which is stored in the memory 39. Also, the machine learning executor 95 reads (2) a thermal displacement estimation log, which is thermal displacement correction data at the actual machining time. Further, the machine learning executor 95 reads (3) a temperature log, which has been detected and stored at predetermined intervals.

In this respect, (1) the learning function data Σ is learning data used when the current correction coefficient was calculated. It is to be noted, however, that the (1) data is not essential data, and may be omitted.

By referring to FIG. 9, an example thermal displacement correction log will be described. Data read as the thermal displacement correction log subsequently to the date and time when the workpiece was machined are movement position data of tool rests such as the X axis upper tool rest, the Y axis upper tool rest, and the Z axis upper tool rest. By referring to FIG. 10, an example temperature log will be described. The temperature log is such that temperatures at the temperature sensors T1 to T6 are read at, for example, 10-second intervals, and each temperature is stored in correlation with the date and time of reading. This ensures that the X axis upper tool rest, the Y axis upper tool rest, and the Z axis upper tool rest corresponding to a date and time can be correlated with the temperature corresponding to the same date and time.

Step S15

At step S15, the machine learning executor 95 reads learning data. As used herein, the term "learning data" is intended to mean machining dimension data specified by the learning data generation/generation result display 83.

Step S17

At step S17, the machine learning executor 95 reads a learning weight condition. As used herein, the term "learning weight condition" is intended to mean a condition for which the number of data of a particular learning target regarded as important is increased when one workpiece is machined, so as to set a weight given to the learning target.

In performing a thermal displacement correction in a machine tool, it is necessary to control a large number of targets of the machine tool individually for each machined portion of a workpiece. For example, it is necessary to control the upper tool rests and the lower tool rests of the X, Y, and Z axes of the machine tool individually. Each of these large number of learning targets is different from each other in terms of degree of importance and/or influence on another control target. Under the circumstances, it is possible to increase or decrease the number of data of a particular learning target so as to control the influence that the learning target has on the machining of the workpiece as a whole. Thus, a weight is set on an individual-learning-target basis. This ensures that the thermal displacement correction as a whole can be adjusted by prioritizing the accuracy of an important portion of a machining target workpiece over the accuracy of another portion of the workpiece. At the same time, the machining accuracy of a workpiece as a whole can be set within a desired range. This ensures a correction coefficient used in a thermal displacement correction equation for a thermal displacement correction suitable for an environment in which a machine tool is provided.

Specifically, the level of weighting can be selected from five levels. At level five, which is the highest level, the number of data of a weighting target may be increased by, for example, 50 times, after which the data may be reflected in the thermal displacement correction as a whole.

Step S19

At step S19, the machine learning executor 95 converts the learning data into "no-thermal-displacement-correction data".

Specifically, at step S19, the machine learning executor 95 performs processing of converting the measurement value that is included in the learning data read at step S15 and that is illustrated in, for example, FIG. 11 into dimension data that is for a case where no correction was made and that is illustrated in, for example, FIG. 12.

In the learning data example illustrated in FIG. 11, the following various data are stored in a memory subsequently to the machining date and time data. Trigger # is a number assigned to a machined portion of a workpiece. When "1" is assigned to the initial product, this indicates that a tool exchange has been performed. Measurement value is dimension data that has been measured. Target value is a target dimension of machining. Offset is the amount of movement of the cutting edge input by the operator. Upper limit and Lower limit are those of tolerance. When 0 is 1, the data value is in diameter. Learning target is information for identifying a learning target axis. Workpiece No. is information for identifying a machining program. Correction amount is a correction position on the tool cutting edge. Temperature data is such that a temperature at a date and time of machining is stored. Thus, various machining data are stored in one row in a file so that the data are correlated with each other.

The data illustrated in FIG. 12 is such that the measurement value included in the data illustrated in FIG. 11 is replaced with dimension data for a case where no correction was made. Otherwise, the data illustrated in FIGS. 11 and 12 are identical.

In the example illustrated in FIG. 12, the value of the no-correction data is calculated as follows:

$$35.010+0.02-0.0206=35.0094$$

In this equation, "35.010" corresponds to the measured dimension value illustrated in FIG. 11. Also, "0.02" corresponds to the offset illustrated in FIGS. 11 and 12.

Further, "−0.0206" is obtained by converting the correction amount illustrated in FIGS. 11 and 12 into a value of the same unit as the dimension data.

At step S19, the above-described processing is performed because of a reason described below. The dimension data input into the dimension data input receiver 75 is a result of a past thermal displacement correction already performed. Under the circumstances, in order to perform a new machine learning, it is necessary to: remove the influence of the thermal displacement correction to retrieve the state in which no thermal displacement correction was performed; and reflect a result of a new machine learning.

Step S21

At step S21, the machine learning executor 95 extracts, based on the setting made at the learning condition setter 89, a "weight" for the learning data from a weight table.

As illustrated in FIG. 13, a specific example of weighting is to: extract 5 as a weight at LeveL 1; extract 10 as a weight at LeveL 2; extract 20 as a weight at LeveL 3; extract 35 as a weight at LeveL 4; and extract 50 as a weight at LeveL 5. These weight values indicate that the number of data of interest is increased by adding a number of data corresponding to a weight value, after which a re-calculation is performed. This indicates that as the weight becomes greater, the number of data increases, and this increases the influence on the correction amount.

Step S23

At step S23, the machine learning executor 95 increases the amount of the "no-thermal-displacement-correction data" by an amount equivalent to the weight.

Step S25

At step S25, the machine learning executor 95 adds the increased "no-thermal-displacement-correction data" and the learning function data E together, and then obtains a new correction coefficient by solving an inverse matrix.

A specific example of how to calculate in the processing at step S25 will be described.

In the machine tool, the learning function data E and data obtained during an actual machining (this data will be hereinafter also referred to as "actual machining data") are stored. The learning function data E is stored in the memory 39, and the actual machining data is stored in the temperature logger 31 and the thermal displacement estimated amount logger 45.

The learning function data $\Sigma$, which is stored in the memory 39, includes temperature matrix ($\Pi$) and thermal displacement amount matrix ($\gamma$). In the temperature matrix, a number of pieces of temperature data equal to the number of samples are arranged in the vertical direction, and measurement values corresponding to the respective temperature sensors are arranged in the lateral direction. In the thermal displacement amount matrix, a number of pieces of displacement data equal to the number of samples are arranged in the vertical direction.

As seen in Equation 1, by multiplying the temperature matrix (Π) by correction coefficient (α), thermal displacement correction amount matrix (yc) is obtained for each sample. That is, there is a relationship represented by yc=Π·α.

$$\begin{bmatrix} y_{c1} \\ y_{c2} \\ \vdots \\ \vdots \end{bmatrix} = \begin{bmatrix} T_1 & T_2 & \ldots & T_n \\ & & \cdot & \\ & & \cdot & \\ & & \vdots & \end{bmatrix} \begin{bmatrix} a_1 \\ a_2 \\ \vdots \\ a_n \end{bmatrix} \quad \text{[Equation 1]}$$

A regression analysis is performed and the correction coefficient (α) is obtained by solving Equation 2 so that the thermal displacement correction amount matrix (yc) is as close as possible to the thermal displacement amount matrix (γ). In Equation 2, Π' denotes a transposed matrix of Π. The correction coefficient (α) thus obtained is regarded as an original (pre-learning) correction coefficient.

$$\alpha = [\Pi' \cdot \Pi]^{-1} \cdot [\Pi' \cdot \gamma] \quad \text{[Equation 2]}$$

In contrast, data in the case of performing actual machining is represented by the following Equation 3.

$$\begin{bmatrix} T_1 & T_2 & \ldots & T_n \\ & & \cdot & \\ & & \cdot & \\ & & \cdot & \end{bmatrix} \begin{bmatrix} y_1 \\ y_2 \\ \cdot \\ \cdot \end{bmatrix} \quad \text{[Equation 3]}$$

In this Equation, the left side matrix, which is temperature data in the case of performing actual machining, will be referred to as data η, and the right side matrix, which is the thermal displacement amount, will be referred to as Y.

Then, η'η and ∂'Y, which are products obtained from multiplications using the transposed matrix η' of η are added to the original data that is stored. Then, the resulting sum is multiplied by an inverse matrix. As a result, a post-learning, new correction coefficient anew is obtained.

The new correction coefficient (after learning) thus obtained is represented by the following Equation.

$$\alpha\_\text{new} = [\Pi' \cdot \Pi + \eta' \cdot \rho]^{-1} \cdot [\Pi' \cdot \gamma + \eta' \cdot Y] \quad \text{[Equation 4]}$$

Thus, actual machining data is added to the learning function data Σ, which is stored in the memory 39. This eliminates or minimizes a large degree of deviation of the learning result, realizing a stable operation. It is to be noted, however, that the actual machining data is smaller in data volume than the learning function data Σ, which is stored in the memory 39, and that an effect attributed to the actual machining data may less likely to be appreciated. In light of this, it is possible to cause the machine learning executor to change the learning weight condition so as to emphasize an effect attributed to the actual machining data. Specifically, this can be realized by multiplying the actual machining data by weight co, as in Equation 5.

$$\alpha\_\text{new} = [\Pi' \cdot \Pi + \omega \cdot \eta' \cdot \eta]^{-1} \cdot [\Pi' \cdot \gamma + \omega \cdot \eta' \cdot Y] \quad \text{[Equation 5]}$$

Step S27

At step S27, the learning result display/executor 99 displays, on the estimated value display 103, a simulation graph obtained using the new correction coefficient.

Figure 16:
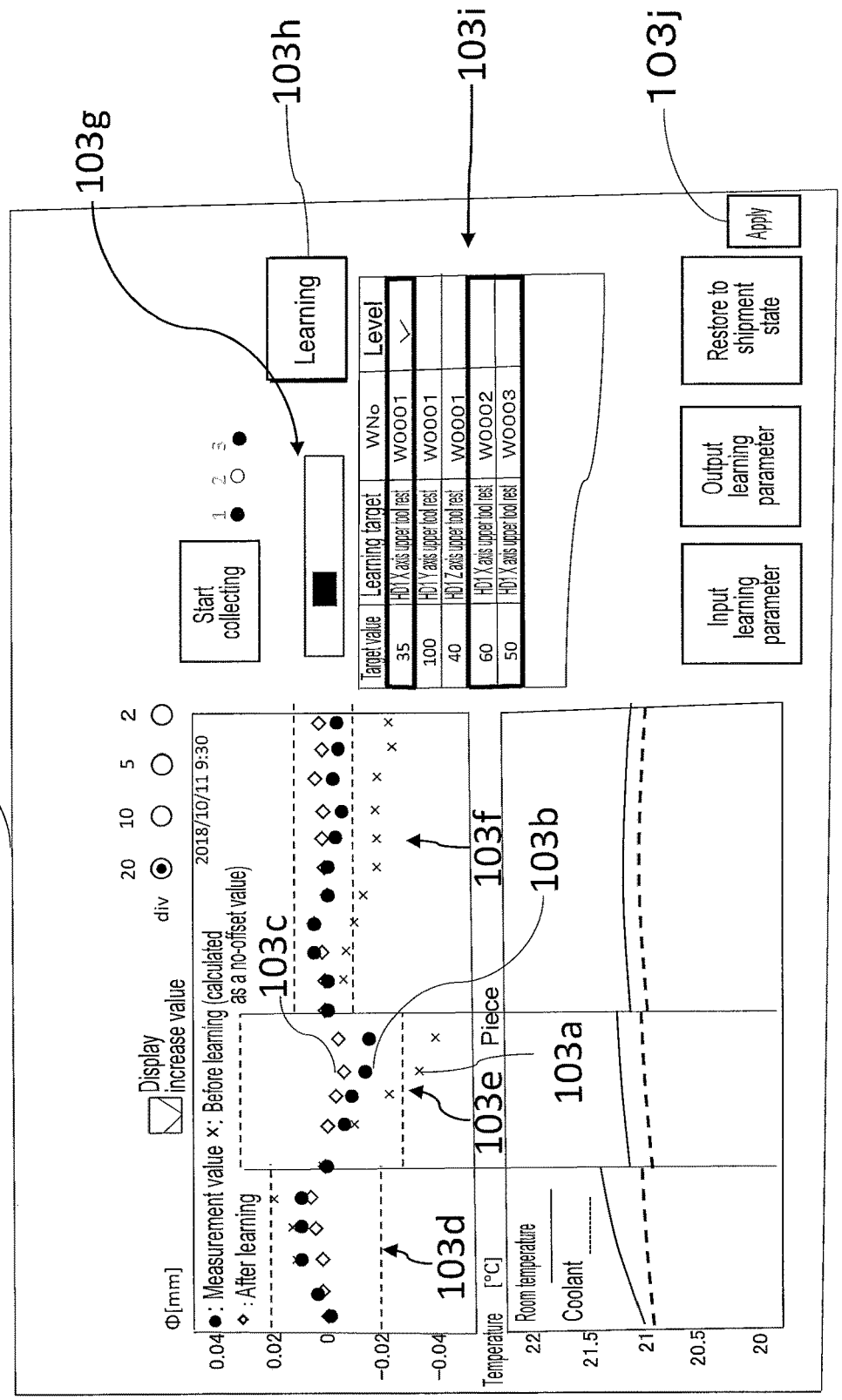
FIG. 16 illustrates an estimated value display.

FIG. 16 illustrates an example simulation graph displayed on the estimated value display 103. In this example, the simulation graph shows simulations results associated with three kinds of workpiece numbers, namely, "W0001", "W0002", "W0003".

Specifically, the workpiece number "W0001" is a simulation graph associated with a left portion 103d, the workpiece number "W0002" is a simulation graph associated with a middle portion 103e, and the workpiece number "W0003" is a simulation graph associated with a right portion 103f.

In this example, data 103a, which is indicated by symbol "x", is data in a case where no correction was performed; data 103b, which is indicated by a black filled circle, is data of a measurement result obtained by the operator; and data 103c, which is indicated by a white-background square outline, is data of a result in a case where the new correction coefficient was used.

the controller or the machine tool according to this embodiment displays, for all machining target portions that have been specified, a simulation graph of estimated values associated with a machining performed using a post-learning correction coefficient. In the FIG. 16 example, machining results associated with three workpiece numbers are displayed at a time. This enables the operator to check whether all the machining results are kept within a desired tolerance.

That is, estimated values associated with a plurality of machining target portions are displayed simultaneously. This manner of display enables the operator to easily visually check how the machining accuracy at each portion changes and whether a necessary tolerance is secured. This ensures a correction coefficient used in a thermal displacement correction equation for a thermal displacement correction suitable for an environment in which a machine tool is provided.

Step S29

At step S29, the operator makes a determination as to whether a simulation result shows a sufficient level of machining accuracy. When the operator has determined that the machining accuracy is insufficient, the operator sets the learning level to, for example, a heavy level using a learning level setting column 103g illustrated in FIG. 16. Then, the operator presses a learning button 103h to return the learning level processing to step S09. The operator may repeat this operation until the operator determines that a sufficient level of machining accuracy is secured, with the result data kept within the tolerance range.

When the operator has determined that the simulation result shows a sufficient level of machining accuracy, the procedure proceeds to step S31.

Step S31

At step S31, the operator presses a memory rewriting execution button 103j to rewrite the content of the thermal displacement correction equation memory 41 of the memory 39 illustrated in FIG. 2.

Description will be made with regard to a modification of the input of dimension data performed at step S03. The dimension data may be processed through the following steps.

[1-1] Data is input into the trigger screen, and trigger information is stored.

[2-1] In the range specified by trigger information, all learning data excluding a measurement value are collected only once.

[3-1] After a machining, a measurement value (dimension data) at the date and time of the machining is input.

[4-1] [2-1] and [3-1] are repeated by a number of times equal to or less than the number of workpieces to be machined; or [2-1] is repeated and then [3-1] is collectively performed by a number of times equal to or less than the number of workpieces.

[5-1] A learning is performed according to a learning flow. This method ensures that data necessary for learning can be stored in a memory based on trigger information from an initial stage of data accumulation. This eliminates the need for, at a later step, identifying a data range from which to extract data necessary for learning.

The dimension data may also be processed using the following method.

[1-2] Data is input into the trigger screen, and trigger information is stored.

[2-2] All learning data excluding a measurement value are always collected, irrespective of trigger information.

[3-2] After a machining, data is extracted that is necessary for learning and that is associated with workpiece No. and block No. in the range specified by the trigger information.

[4-2] After the machining, a measurement value (dimension data) at the date and time of the machining is input.

[5-2] A learning is performed according to a learning flow.

This method ensures that from the start of learning, necessary data can be selected from all the learning data accumulated.

The above-described two kinds of methods are switchable using buttons 69l and 69m illustrated in FIG. 14.

It is to be noted that the data of the machining data and/or the correction parameter used in this embodiment may be transferred to a controller and/or a machine tool that are similar in kind to the controller and/or the machine tool according to this embodiment. That is, a result obtained in one apparatus (device) may be shared with a similar kind of apparatus (device) that operates under similar conditions. Thus, data may be horizontally expanded. This effectively increases the operation efficiency with which a plurality of similar apparatuses (devices) are operated.

As has been described hereinbefore, with the controller or the machine tool according to this embodiment, the operator only has to select an item that requires a machining accuracy (an example item is a machining program number) and press the machine learning execution button. In this manner, the operator is able to obtain a simulation result based on machining data. Additionally, the operator is able to visually check, in the form of a list, results for all machined portions that the operator desires to check. This enables the operator to easily determine whether each portion is kept within a specified tolerance.

Also, the controller or the machine tool according to this embodiment performs a learning of all machined portions collectively, and sets a correction coefficient that satisfies all the machined portions. This reduces the occurrence of a result showing a deviation from the target dimension.

Further, a learning level of machine learning can be set based on the degree of importance on a workpiece basis or on a workpiece-machined-portion basis, and a learning of a plurality of workpieces is performed collectively. This reduces the labor involved in adjustment work and ensures that fine adjustments are easily performed. Also, there may be a case where it is necessary to manually set a thermal displacement correction amount that varies on an individual-machined-portion basis. In this case, if there is a large difference between the thermal displacement correction amounts set for the machined portions, a stepped machined surface may occur at a portion where adjacent machined portions abut. This issue is dealt with by the configuration of the above-described embodiment, in which a correction coefficient is automatically set by selecting a machined portion. This configuration eliminates or minimizes erroneous setting due to human error, preventing such a situation in which a stepped machined surface occurs.

While the present invention has been described by means of an embodiment, it will be readily appreciated that the technical scope of the present invention will not be limited to the above-described embodiment, and that the above-described embodiment may be changed or modified in many different ways. It will also be readily appreciated that the above-described embodiment changed or modified in many different ways are also encompassed within the technical scope of the present invention.

Further, in the present invention, it will be readily appreciated that the section termed as function section may be implemented by a CPU including a storage device such as a memory and software introduced in these elements, or may be implemented by an electronic circuit, a logic circuit, and/or other related devices. It will also be readily appreciated that the section termed as display may be implemented by a screen, or the data input-output function of the display may be implemented by a sensor.

It will also be readily appreciated that the controller and/or the machine tool according to the above-described embodiment may also be applied to a lathe, a machining apparatus, and a discharge machining apparatus, among other apparatuses or devices.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A controller comprising:
   machining data collect circuitry configured to collect machining data including a date and a time when at least one machined portion of a workpiece has been machined by a machine tool, the at least one machined portion being set as a learning target;

temperature circuitry configured to obtain, at predetermined time intervals, temperature data at a plurality of positions on the machine tool;

dimension data input circuitry configured to receive dimension measurement data which includes a dimension of the at least one machined portion after the at least one machined portion has been machined;

learning data generate circuitry configured to generate learning data based on the machining data and the dimension measurement data; and machine learning circuitry configured to execute a machine learning based on the temperature data and the learning data to obtain a correction coefficient based on which a displacement caused by a change in a temperature of the machine tool is corrected according to a thermal displacement correction equation, wherein the machining data collect circuitry comprises trigger setting input circuitry configured to receive a first input of the at least one machined portion as the learning target, the trigger setting input circuitry configured to receive a second additional input including a target dimension of a workpiece, an upper tolerance limit from the target dimension, and a lower tolerance limit from the target dimension selected from a plurality of different trigger settings for collection of the machining data.

2. The controller according to claim 1, further comprising:
learning condition setting circuitry configured to set a learning weight condition.

3. The controller according to claim 2, wherein the learning condition setting circuitry is configured to set the learning weight condition for each of the at least one machined portion.

4. The controller according to claim 1, further comprising:
estimated value display configured to display an estimated value when the workpiece is machined with the correction coefficient calculated after the machine learning.

5. The controller according to claim 4, wherein the estimated value display is configured to display estimated values at a plurality of machined portions of the workpiece.

6. The controller according to claim 1, wherein the machining data further includes information to identify a target axis among axes along which a movable member of the machine tool moves, the target axis being set as the learning target.

7. The controller according to claim 1, wherein the machining data further includes information to identify a target machining program among machining programs for machining the workpiece, the target machining program being set as the learning target.

8. The controller according to claim 7, wherein the at least one machined portion is identified with a number indicating, in a machining program, a position which is set as the learning target.

9. The controller according to claim 1,
wherein the machining data collect circuitry is configured to collect all the machining data except for the dimension measurement data when the at least one machined portion has been machined, and
wherein the dimension data input circuitry is configured to
(i) receive the dimension measurement data every time the workpiece has been machined, and repeatedly receive the dimension measurement data by a number equal to a number of workpieces, or (ii) repeatedly collect the learning data by the number equal to the number of the workpieces, and receive a collection of the dimension measurement data equal to the number of the workpieces.

10. The controller according to claim 1, wherein the dimension measurement data is configured to be collected from one of
means for calling externally measured machining dimension measurement data;
means for calling internally measured machining dimension measurement data;
means for receiving a manual input of machining dimension measurement data; and
means for measuring a change in a coordinate of a predetermined position of the machine tool to determine machining dimension measurement data.

11. The controller according to claim 1, wherein the learning data comprises offset data for correcting a machining dimension of the workpiece.

12. A machine tool comprising:
machining data collect circuitry configured to collect machining data including a date and a time when at least one machined portion of a workpiece has been machined by the machine tool, the at least one machined portion being set as a learning target;
temperature circuitry configured to obtain, at predetermined time intervals, temperature data at a plurality of positions on the machine tool;
dimension data input circuitry configured to receive dimension measurement data which includes a dimension of the at least one machined portion after the at least one machined portion has been machined;
learning data generate circuitry configured to generate learning data based on the machining data and the dimension measurement data; and
machine learning circuitry configured to execute a machine learning based on the temperature data and the learning data to obtain a correction coefficient based on which a displacement caused by a change in a temperature of the machine tool is corrected according to a thermal displacement correction equation,
wherein the machining data collect circuitry comprises trigger setting input circuitry configured to receive a first input of the at least one machined portion as the learning target, the trigger setting input circuitry configured to receive a second additional input including a target dimension of a workpiece, an upper tolerance limit from the target dimension, and a lower tolerance limit from the target dimension selected from a plurality of different trigger settings for collection of the machining data.

13. A calculation method comprising:
setting at least one machined portion of a workpiece as a learning target;
collecting machining data including a date and a time when the at least one machined portion has been machined by a machine tool;
obtaining, at predetermined time intervals, temperature data at a plurality of positions on the machine tool;
receiving dimension measurement data which includes a dimension of the at least one machined portion after the at least one machined portion has been machined;
generating learning data based on the machining data and the dimension measurement data; and
executing a machine learning based on the temperature data and the learning data to obtain a correction coefficient based on which a displacement caused by a change in a temperature of the machine tool is corrected according to a thermal displacement correction equation, wherein the collection of machining data comprises receiving a first input of the at least one machined portion as the learning target, and receiving a second additional input including a target dimension of a workpiece, an upper tolerance limit from the target dimension, and a lower tolerance limit from the target dimension selected from a plurality of different trigger settings for collection of the machining data.

14. A non-transitory computer readable storage medium retrievably storing a computer-executable program therein, the computer-executable program causing a computer to perform a calculation method, the calculation method comprising:

setting at least one machined portion of a workpiece as a learning target;

collecting machining data including a date and a time when the at least one machined portion has been machined by a machine tool;

obtaining, at predetermined time intervals, temperature data at a plurality of positions on the machine tool;

receiving dimension measurement data which includes a dimension of the at least one machined portion after the at least one machined portion has been machined;

generating learning data based on the machining data and the dimension measurement data; and executing a machine learning based on the temperature data and the learning data to obtain a correction coefficient based on which a displacement caused by a change in a temperature of the machine tool is corrected according to a thermal displacement correction equation, wherein the collection of machining data comprises receiving a first input of the at least one machined portion as the learning target, and receiving a second additional input including a target dimension of a workpiece, an upper tolerance limit from the target dimension, and a lower tolerance limit from the target dimension selected from a plurality of different trigger settings for collection of the machining data.

* * * * *